April 28, 1959     B. W. AMMANN     2,883,949
COIL TYING MACHINE AND METHOD OF TYING COILS
Filed July 1, 1954     11 Sheets-Sheet 1
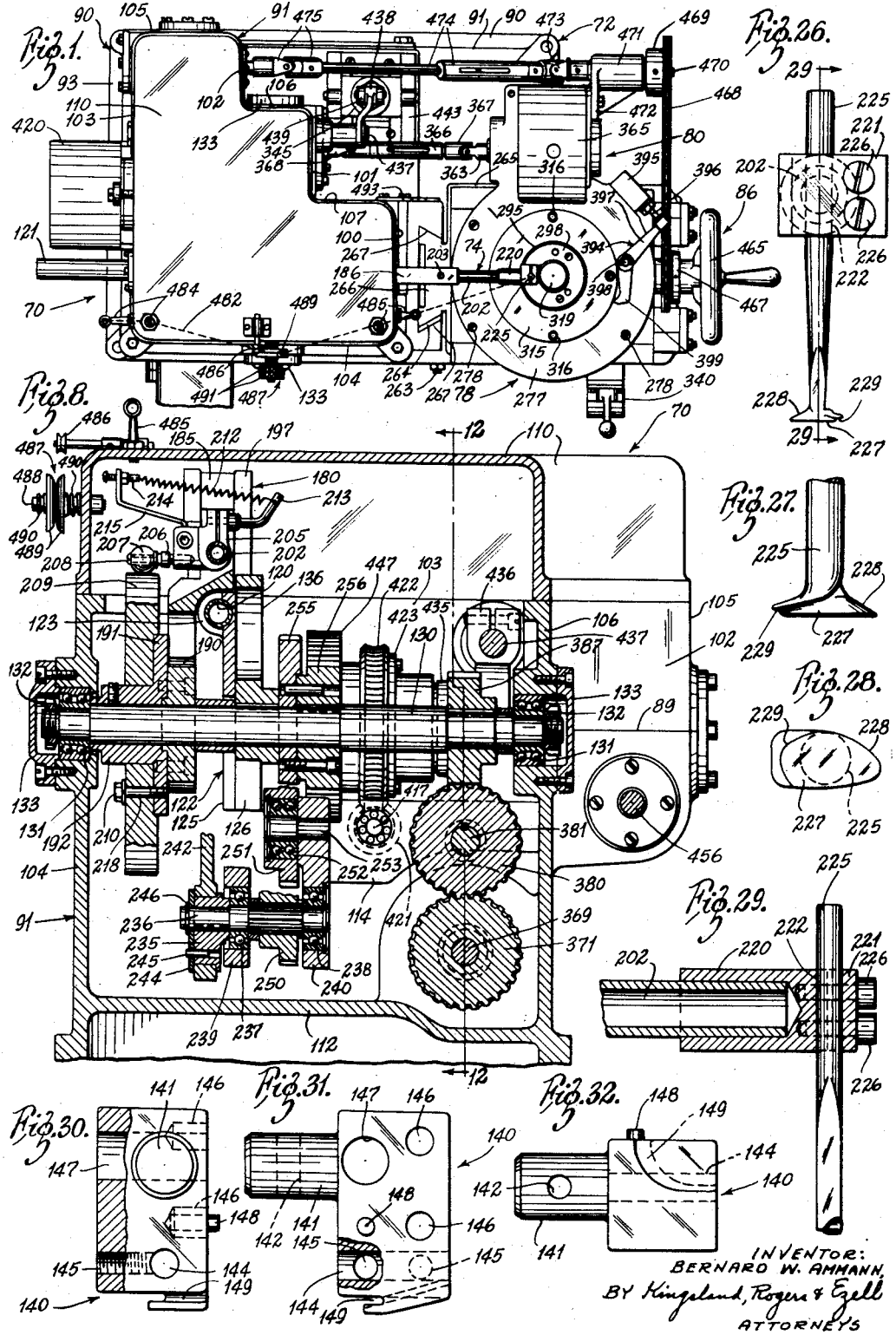
INVENTOR:
BERNARD W. AMMANN,
BY Kingsland, Rogers & Ezell
ATTORNEYS April 28, 1959 B. W. AMMANN 2,883,949
COIL TYING MACHINE AND METHOD OF TYING COILS
Filed July 1, 1954 11 Sheets-Sheet 2
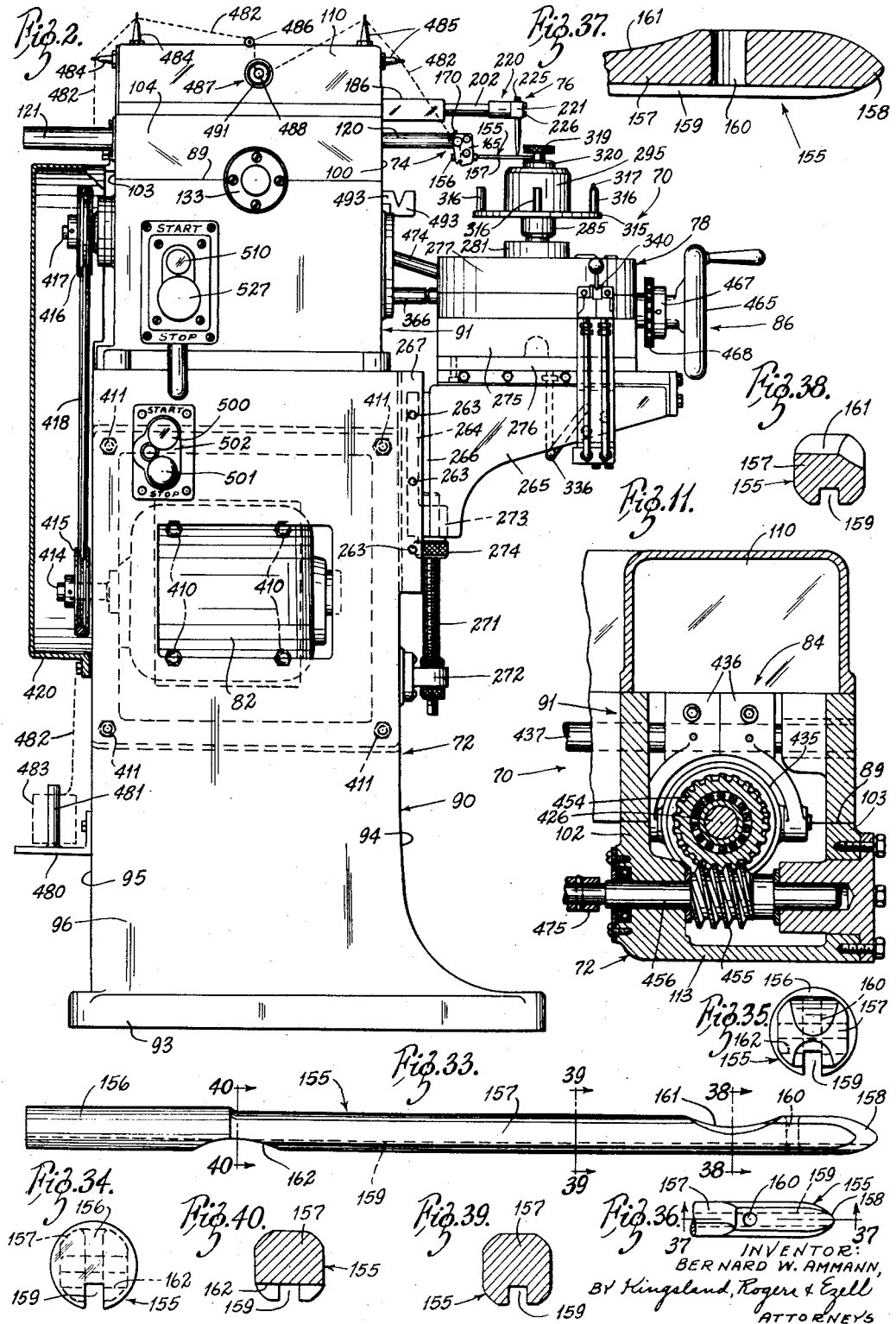
INVENTOR:
BERNARD W. AMMANN,
BY Kingsland, Rogers & Ezell
ATTORNEYS

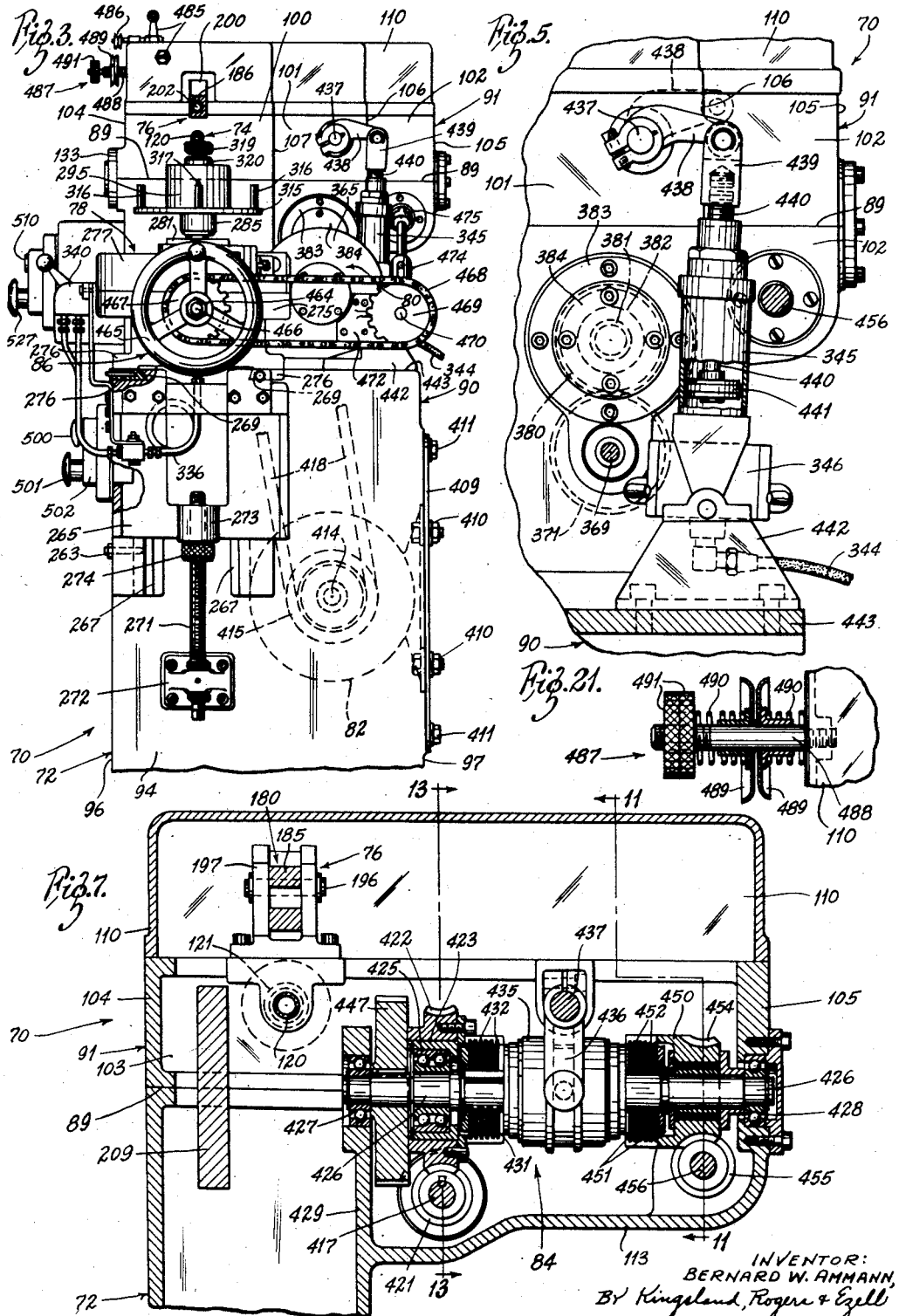

April 28, 1959 B. W. AMMANN 2,883,949
COIL TYING MACHINE AND METHOD OF TYING COILS
Filed July 1, 1954 11 Sheets-Sheet 4
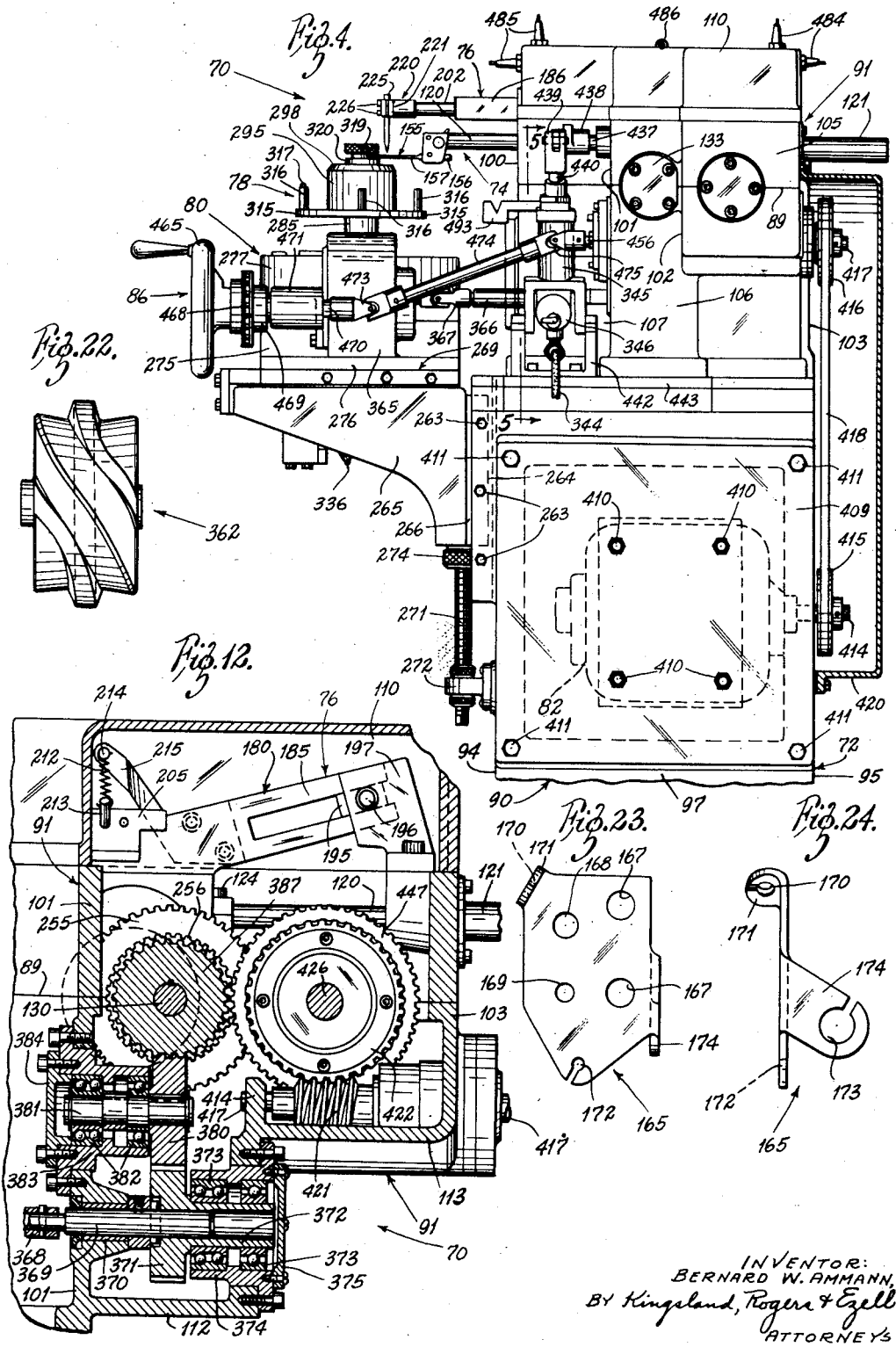
INVENTOR:
BERNARD W. AMMANN,
By Kingsland, Rogers & Ezell
ATTORNEYS

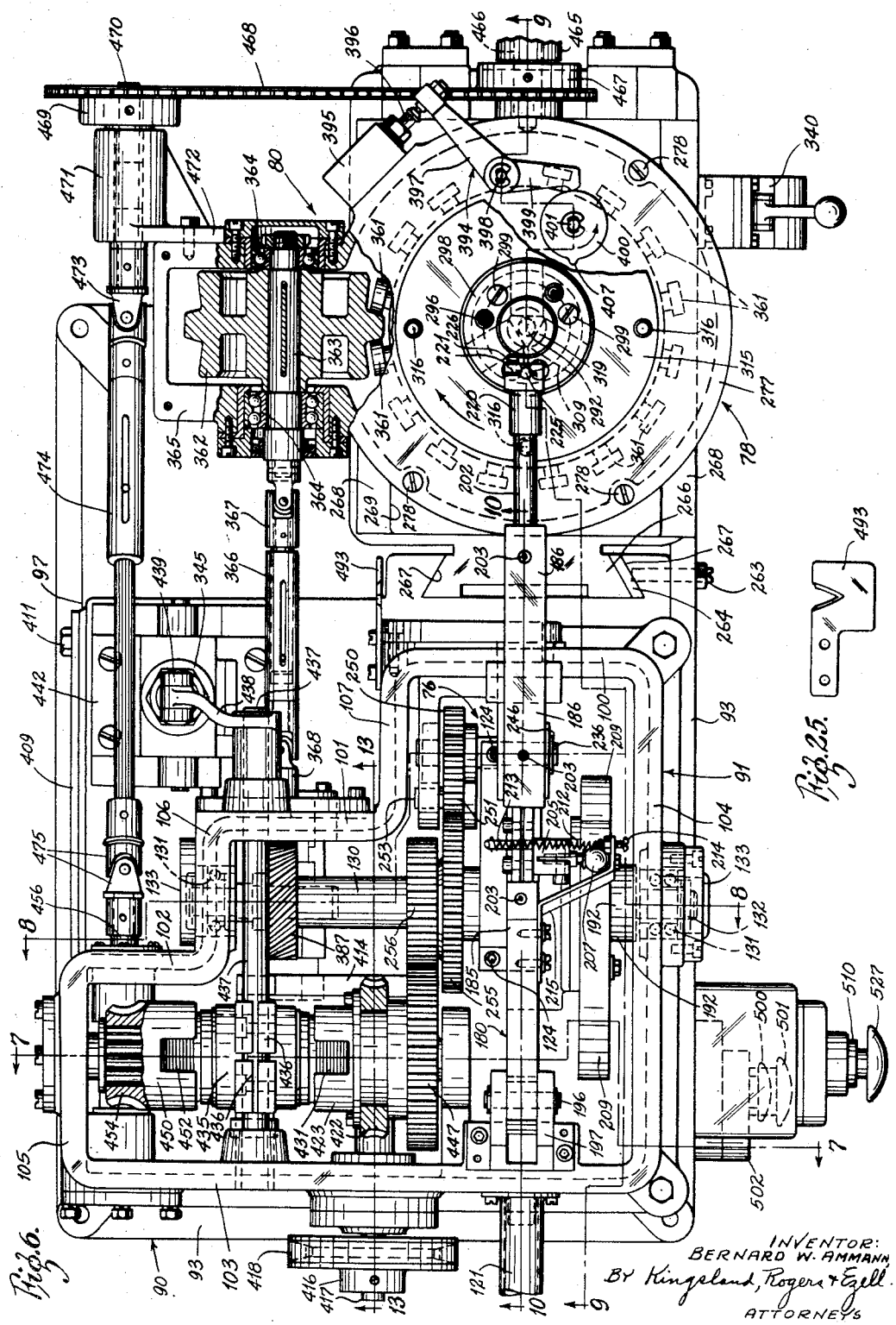

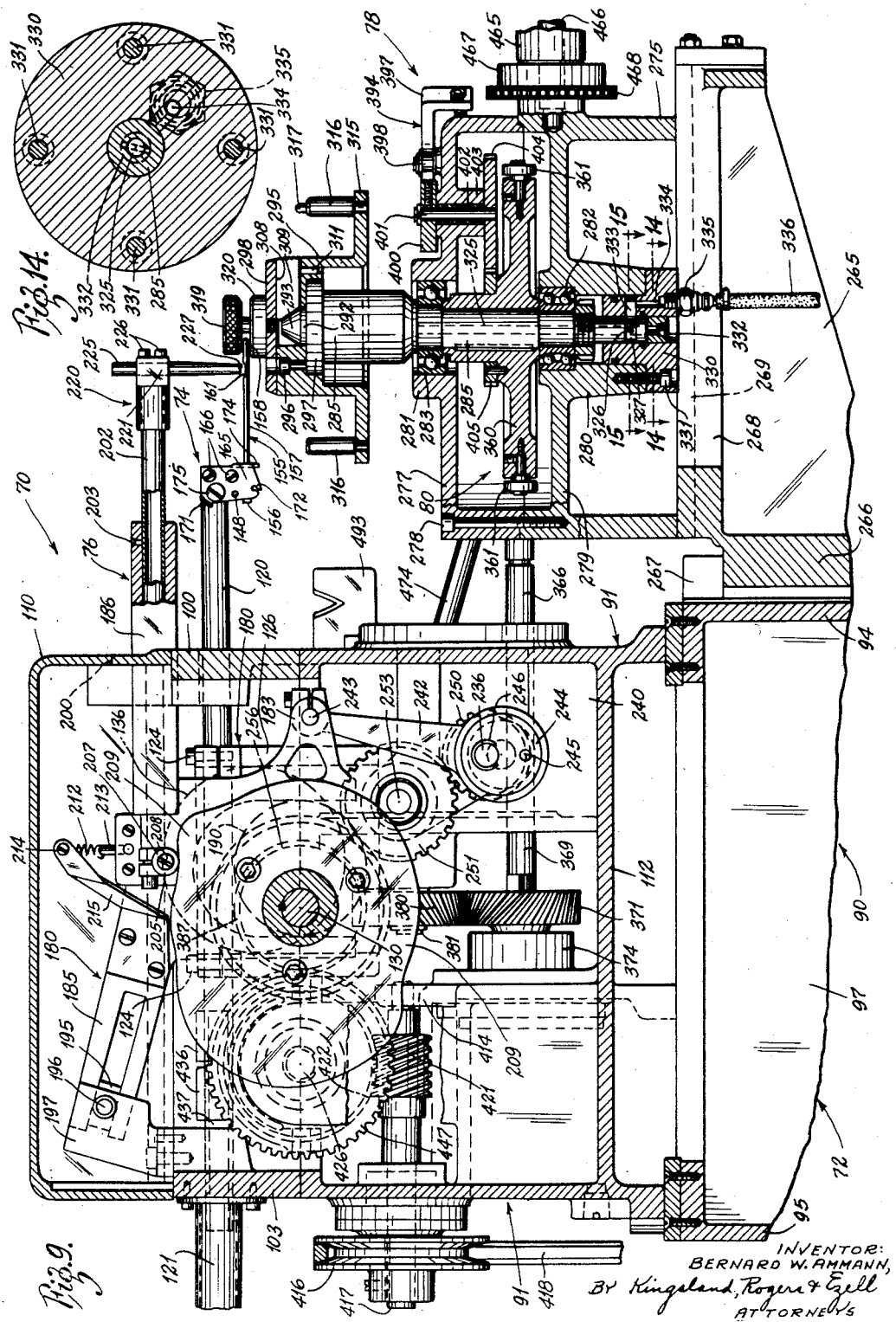

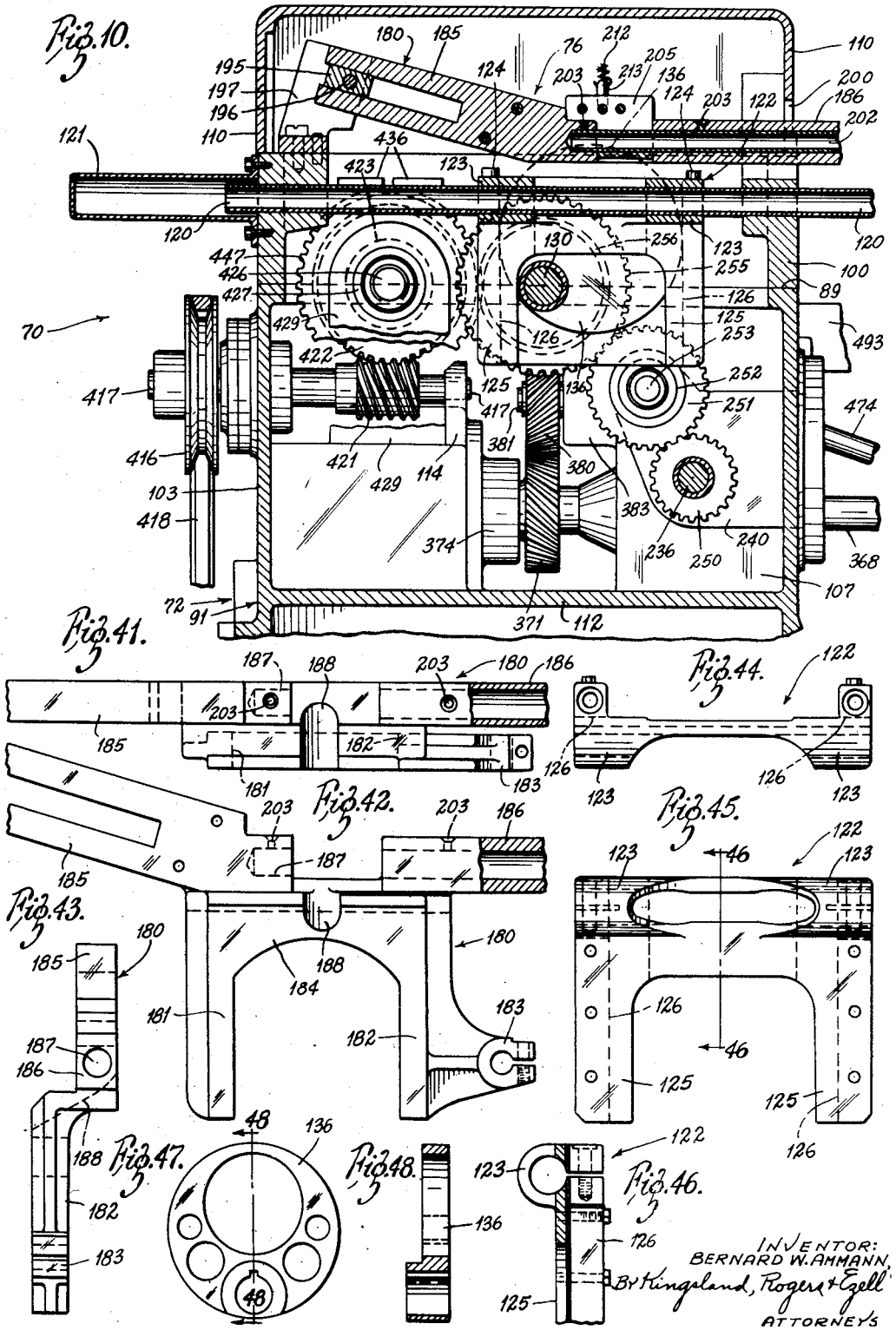

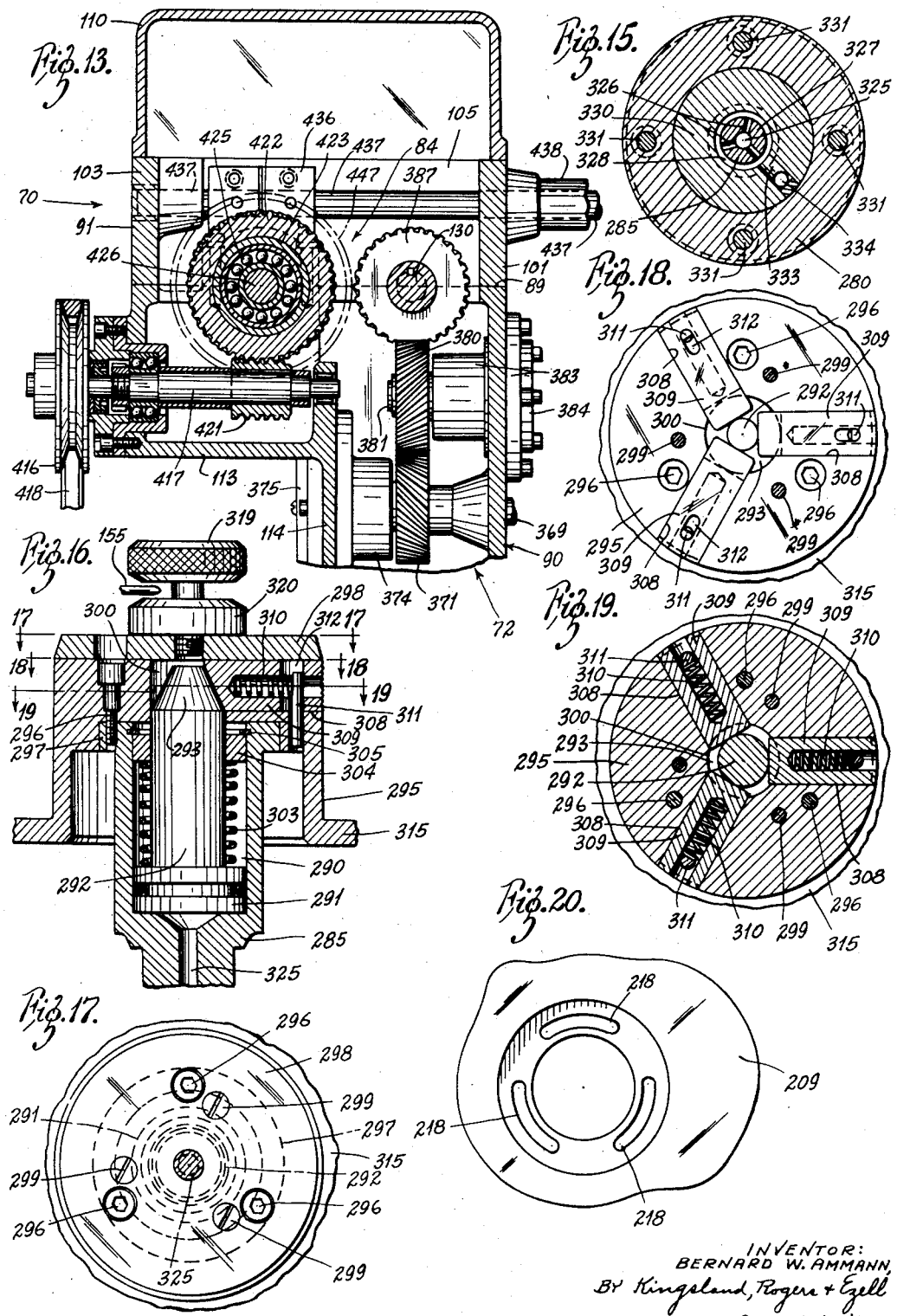

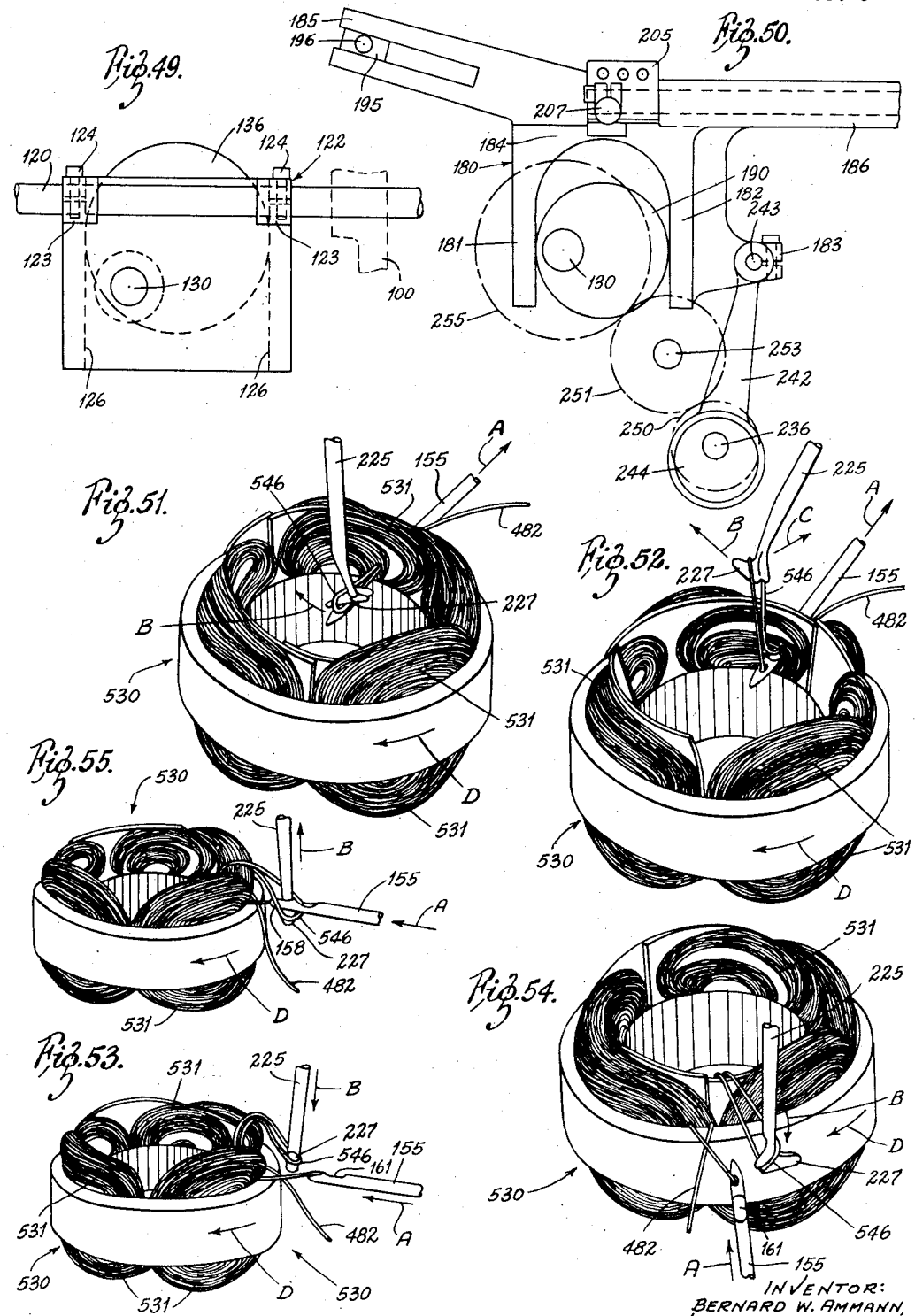

April 28, 1959
B. W. AMMANN
2,883,949
COIL TYING MACHINE AND METHOD OF TYING COILS
Filed July 1, 1954
11 Sheets-Sheet 10
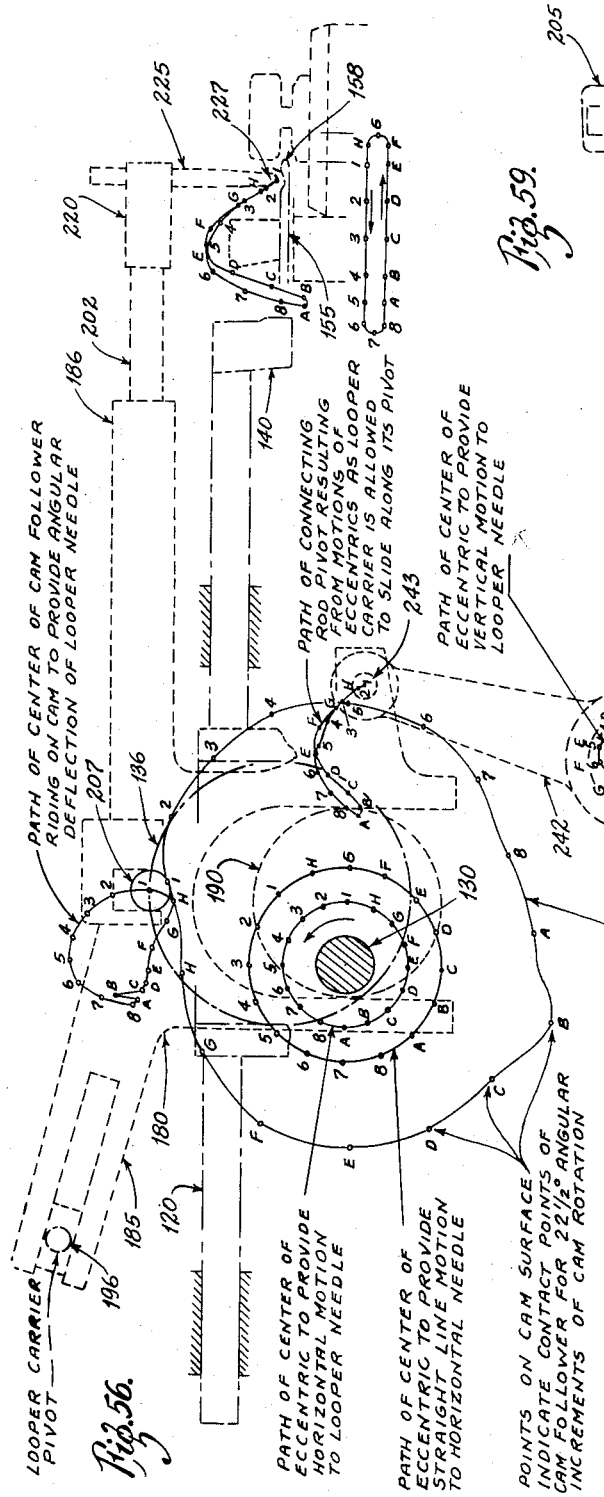
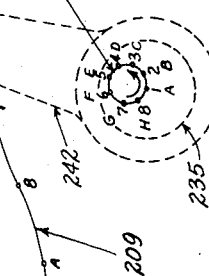
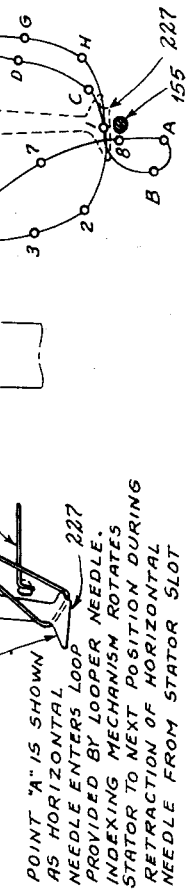
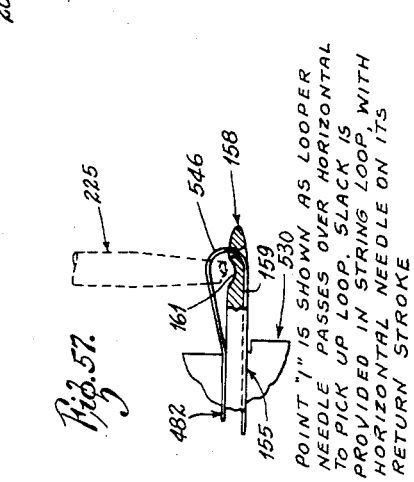
INVENTOR:
BERNARD W. AMMANN,
BY Kingsland, Rogers & Ezell

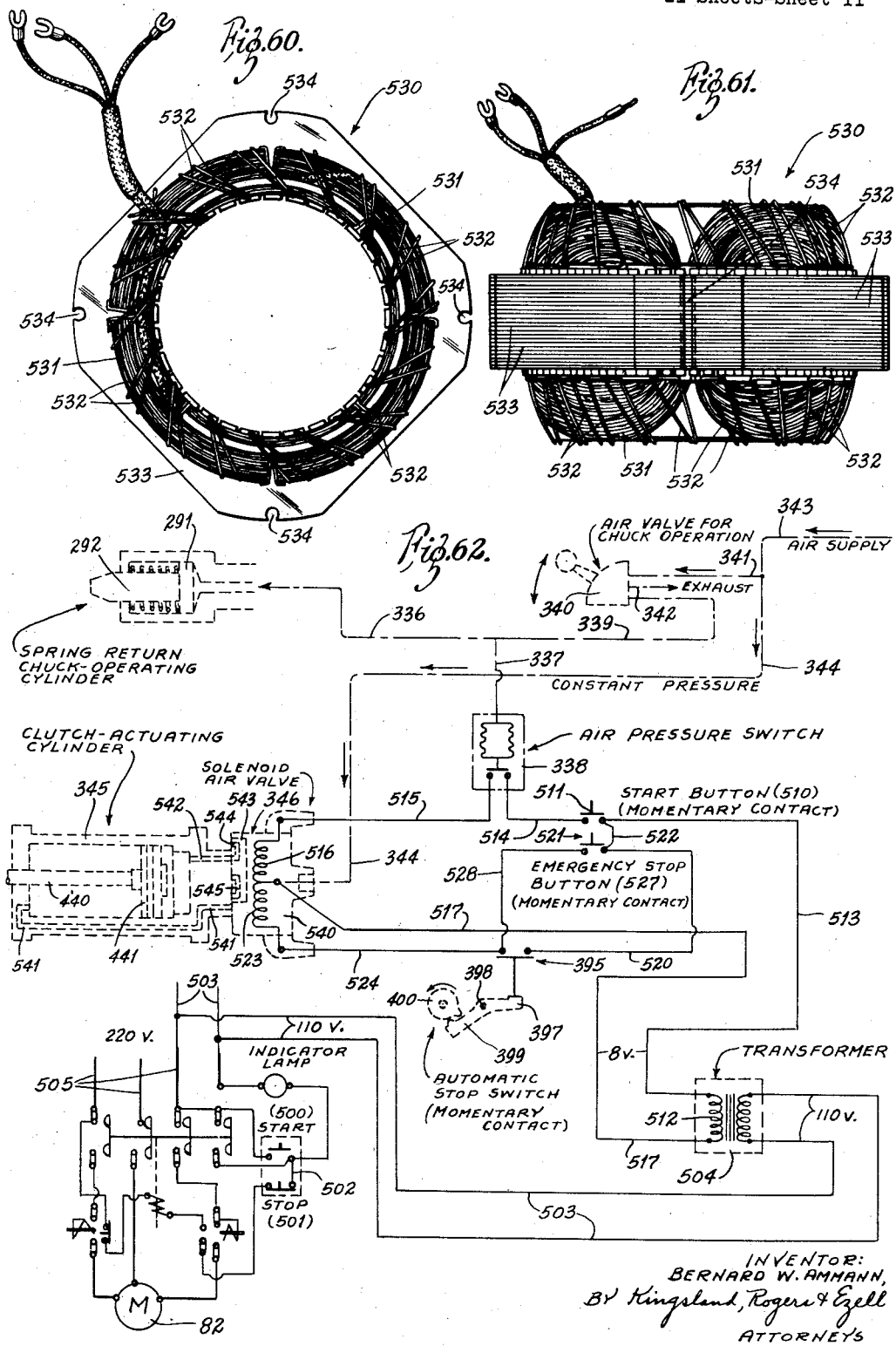

United States Patent Office 2,883,949
Patented Apr. 28, 1959

2,883,949

COIL TYING MACHINE AND METHOD OF TYING COILS

Bernard W. Ammann, Northwoods, Mo., assignor to The Emerson Electric Manufacturing Company, St. Louis, Mo., a corporation of Missouri Application July 1, 1954, Serial No. 440,725

10 Claims. (Cl. 112—2)

The present invention relates generally to the art of tying or lacing dynamo-electric coils, and more particularly to a novel method of and to a novel power-actuated automatic machine for tying or lacing the projecting coils of a dynamo-electric stator, or the like.

There has long existed the need for a machine which will efficiently, automatically lace or tie the projecting windings of a dynamo-electric stator, or the like, in place for further handling thereof. Attempts have been made in the past to construct machines for the stated purpose, but, in the wide experience of the applicant, they have proved unsatisfactory. The result is that today in the advanced stage of industrial development, such coils are tied in place manually. Manifestly, even though operators are skilled, they can perform the tying task neither as fast nor accurately as an automatic machine fulfilling the long desired functions.

Therefore, an object of the present invention is to provide a novel automatic coil tying machine which overcomes the deficiences of earlier machines, and which automatically tie projecting coils or end wires of dynamo-electric devices swiftly and accurately at minimum cost per device.

Another object is to provide a novel method of tying or lacing the coils of a stator, or the like.

Briefly, the present machine, which achieves the foregoing and other stated objects of the invention, includes a supported turntable for receiving a stator, for example, the projecting coils of which are to be tied or laced. A needle of the sewing machine type is mounted adjacent the turntable upon a needle bar having longitudinally reciprocating motion effected by an eccentric rotatably mounted within a suitable housing. Also mounted adjacent the turntable is a shoe-shape footed member, which is referred to hereinafter as a looper, the looper executing three reciprocating motions per cycle over a small arc, namely, longitudinal, vertical and rotary. The looper, which is suitably mounted upon a carrier actuated by a cam and eccentrics mounted within the housing, picks up the cord from the needle in one position of the latter, carries the loop across the coil windings, and releases the loop in a second position of the needle for locking by the latter in a chain stitch, as is more specifically detailed below. Clutch and brake mechanism is provided for transferring the movement of the rotor shaft of a continuously running motor to the aforementioned cams, eccentrics, and turntable, and to prevent overrun. Means is provided for manually operating the machine.

Another object is to provide a novel coil tying machine incorporating a turntable for supporting stators, or the like, which is adjustable vertically and horizontally so that stators, and the like, of various sizes having any predetermined number of slots, such as the thirty-two shown, may be tied by the machine.

Another object is to provide a novel coil tying machine which automatically ties the coil windings of a stator, or the like, with a chain stitch looped around the coil windings in a spiral pattern.

Another object is to provide a novel coil tying machine which incorporates simple, positive mechanism for manually lacing the coils of a stator, or the like, without deenergizing the continuously running motor which powers the machine.

Another object is to provide a novel coil tying machine in which the timed movements of a cord carrying needle and a looper are positively effected by coordinated eccentric and cam actions.

Another object is to provide a novel coil tying machine which includes relatively few moving parts and which is designed to function for its intended purpose over long periods of time with minimum maintenance and minimum down time.

Another object is to provide a novel coil tying machine which positively ties or laces the coil windings of a stator, or the like, in a predetermined pattern, and automatically stops upon completion of a predetermined tying operation cycle.

Another object is to provide a novel coil tying machine which automatically ties the coil windings of a stator, or the like, in a manner uniform in spacing and in tension, thereby overcoming the lack of uniformity in spacing and in tension found in manually tied coils.

The foregoing and other objects and advantages are apparent from the following description taken with the accompanying drawings, in which:

Figure 1 is a top plan view of a coil tying machine constructed in accordance with the teachings of the present invention (Sheet 1);

Figure 2 is a side elevational view thereof, looking at the left side, the front of the machine being considered as that portion facing to the right in Figure 1, the pulley guard being in section (Sheet 2);

Figure 3 is a front elevational view thereof, the base being broken away from conservation of space (Sheet 3);

Figure 4 is a side elevational view thereof looking at the right side, the pulley guard being in section and the base being broken away for conservation of space (Sheet 4);

Figure 5 is an enlarged fragmentary transverse cross-sectional view taken generally on the line 5—5 of Figure 4, parts being shown in elevation (Sheet 3);

Figure 6 is an enlarged top plan view of the machine, partly in section, the top cover and pulley guard being removed (Sheet 5);

Figure 7 is a vertical, cross-sectional view on substantially the line 7—7 of Figure 6, the cover being included (Sheet 3);

Figure 8 is a vertical, cross-sectional view taken substantially along the line 8—8 of Figure 6, the cover being included, some mechanism not on the line being shown in section for clarity of illustration (Sheet 1);

Figure 9 is a vertical, longitudinal, cross-sectional view taken on substantially the line 9—9 of Figure 6, the cover being included (Sheet 6);

Figure 10 is a vertical, longitudinal cross-sectional view taken on substantially the line 10—10 of Figure 6, the cover being included (Sheet 7);

Figure 11 is a fragmentary, longitudinal, vertical, cross-sectional view on substantially the line 11—11 of Figure 7 (Sheet 2);

Figure 12 is a vertical, longitudinal, cross-sectional view on substantially the line 12—12 of Figure 8 (Sheet 4);

Figure 13 is a vertical, longitudinal, cross-sectional view taken substantially along the line 13—13 of Figure 7 (Sheet 8);

Figure 14 is an enlarged, horizontal, cross-sectional view taken on substantially the line 14—14 of Figure 9 (Sheet 6);

Figure 15 is an enlarged, horizontal, cross-sectional view taken on substantially the line 15—15 of Figure 9 (Sheet 8);

Figure 16 is an enlarged, fragmentary, vertical cross-sectional view of a portion of the turntable mechanism illustrated in elevation in Figure 9 (Sheet 8);

Figures 17, 18 and 19 are horizontal, cross-sectional views taken on substantially the lines 17—17, 18—18, and 19—19 of Figure 16, respectively, the compression springs being omitted in Figure 18 for clarity (Sheet 8);

Figure 20 is a side elevational view of the cam which effects predetermined oscillative or segmental rotative movement of the looper member (Sheet 8);

Figure 21 is an enlarged, cross-sectional view of the thread tensioning device (Sheet 3);

Figure 22 is an enlarged, detail view of the indexing cam member (Sheet 4);

Figure 23 is an enlarged, side elevational view of the cord guide (Sheet 4);

Figure 24 is an enlarged end elevation view thereof (Sheet 4);

Figure 25 is an enlarged detail view of a knife member for severing the cord (Sheet 5);

Figure 26 is an enlarged detail view of the right end of the looper assembly (Sheet 1);

Figures 27 and 28 are further enlarged side elevational and bottom views, respectively, of the lower end of the looper member (Sheet 1);

Figure 29 is a fragmentary, vertical, sectional view on substantially the line 29—29 of Figure 26 (Sheet 1);

Figures 30, 31, and 32 are enlarged end elevational, side elevational, and bottom plan views of the needle supporting chuck, portions of Figures 30 and 31 being in section for illustration of detail (Sheet 1);

Figure 33 is an enlarged, side elevational view of the needle (Sheet 2);

Figures 34 and 35 are left end and right end elevational views thereof, respectively (Sheet 2);

Figure 36 is a fragmentary, plan view of the leading end of the needle (Sheet 2);

Figure 37 is a further enlarged, vertical, cross-sectional view taken on substantially the line 37—37 of Figure 36 (Sheet 2);

Figures 38, 39, and 40 are further enlarged, vertical, transverse, cross-sectional views taken on substantially the lines 38—38, 39—39, and 40—40 of Figure 33 (Sheet 2);

Figure 41 is a top plan view of the looper bar carrier of the looper assembly, a portion being in section for clarity of illustration and parts being broken away for conservation of space (Sheet 7);

Figures 42 and 43 are side elevational and end views thereof, respectively (Sheet 7);

Figures 44 and 45 are top plan and side elevational views of the needle bar carrier, respectively (Sheet 7);

Figure 46 is a vertical, transverse, cross-sectional view taken on substantially the line 46—46 of Figure 45 (Sheet 7);

Figure 47 is a side elevational view of a cam which effects reciprocating movement of the looper assembly (Sheet 7);

Figure 48 is a vertical, cross-sectional view taken on substantially the line 48—48 of Figure 47 (Sheet 7);

Figure 49 is a schematic view in side elevation illustrating the operation of the needle assembly (Sheet 9);

Figure 50 is a schematic view in side elevation illustrating the operation of the looper assembly (Sheet 9);

Figures 51, 52, 53, and 55 are generally diagrammatic views illustrating the tying operation of the present machine upon the uppermost portions of the coil windings of a stator of a motor (Sheet 9);

Figure 54 is a generally diagrammatic view illustrating the same step in the tying operation as is illustrated in Figure 53, but taken at another angle in order to more clearly illustrate the step (Sheet 9);

Figures 56, 57, 58 and 59 are motion diagrams illustrating the respective positions or paths of movement of the looper, the needle, and the actuating members throughout one complete tying step (Sheet 10);

Figure 60 is a top plan view of a stator of a motor after being tied by the present coil tying machine (Sheet 11);

Figure 61 is a side elevational view thereof (Sheet 11); and

Figure 62 is a schematic diagram illustrating the air supply system and the electrical system of the present machine (Sheet 11).

Referring to the drawings more particularly by reference numerals, 70 indicates generally a coil tying machine constructed in accordance with the teachings of the present invention. The machine 70 broadly includes a supporting housing 72, a needle assembly 74 and a looper assembly 76 both mounted in the supporting housing, a turntable assembly 78 mounted to one side of the supporting housing, an indexing mechanism 80 for the turntable assembly, a motor 82, a clutch and brake assembly 84 (Fig. 7), manual operating mechanism 86, an air supply system, an electrical system, and essential interconnecting elements.

The supporting housing 72 includes a generally rectangular base 90 and a sectional upper portion 91 of the top plan configuration shown in Figure 1–4, 6, 8 and 9. The base 90 includes a flat pedestal 93, a front wall 94, a rear wall 95, a left side wall 96, and a right side wall 97. Referring particularly to Figure 6, the sectional upper portion 91 includes front wall portions 100, 101, and 102, a rear wall 103, a left side wall 104, and right side wall portions 105, 106, and 107. The upper portion 91 is sectional, being split at the bearings on the line designated 89 (Fig. 3), to facilitate disassembly. A cover 110 surmounts the upper portion 91 (Figs. 1 and 8). A generally horizontal partition 112 separates the base 90 from the upper portion 91 and forms a top for that portion of the former not beneath the latter due to the stepped form of the front and right side wall portions, the partition 112 being replaced by a partition portion 113 located a predetermined distance thereabove at the corner of the upper portion 91 defined by the front wall portion 102 and the right side wall portion 105 (Figs. 12 and 13). A side wall portion 114 joins the partition 112 and the partition portion 113 and extends above the former. The components of the housing 72 may be welded or bolted together, as desired.

The needle assembly 74 and the individual component elements thereof may be best understood from Figures 2, 4, 8–10, 30–40, 44–48, and 49. The needle assembly 74 includes a needle bar chuck supporting shaft 120, illustrated as a hollow tube, which is supported in aligned openings in the front wall portion 100 and the rear wall 103 of the upper portion 91 of the supporting housing 72 for horizontal reciprocative movement (Figs. 9 and 10). An elongated guard cup 121 is secured to the rear wall 103 by suitable machine screws concentrically of the needle bar chuck supporting shaft 120 as a protection for operating personnel.

A needle bar carrier 122 of the configuration clearly shown in Figures 44–46 is secured to the shaft 120 for movement thereof, the carrier 122 including spaced split sleeve portions 123 which receive the shaft 120 intermediate the ends of the latter. Bolts 124 clamp the split sleeve portions 123 onto the shaft 120 in the selected relation thereof which may be adjusted. The carrier 122 also includes spaced depending legs 125 disposed in a plane to one side of the split sleeve portions 123. Flange plates 126 disposed beneath the split sleeve portions 123 are bolted to the legs 125. The legs 125 straddle a driven shaft 130 (Fig. 10) rotatably mounted in aligned bearings 131 supported in suitable aligned openings in the left side wall 104 and the right side wall portion 106 (Fig. 8). Nuts 132 threadedly engage the ends of the shaft 130. Dust caps 133 secured to the aforesaid left side wall 104 and right side wall portion 106 by machine screws protect the bearings 131.

An eccentric 136 is keyed or otherwise secured to the shaft 130 for rotation therewith and is disposed between the legs 125 and against the flange plates 126 of the needle bar carrier 122 (Figs. 6 and 8). Obviously, rotation of the eccentric 136 will effect reciprocative movement of the carrier 122 and the shaft 120.

To the forward end of the shaft 120 is secured a needle supporting chuck 140 (Figs. 1 and 30–32), which includes a cylindrical portion 141 that extends into the open end of the shaft 120 and is maintained against removal by a pin, or the like, extending through aligned openings in the shaft 120 and through an opening 142 in the cylindrical portion 141. The chuck 140 is generally of the configuration clearly shown in Figures 30–32 and includes a horizontal, longitudinally extending passage 144 into which are tapped spaced threaded passages 145, transverse threaded openings 146 extending in from one side, a transverse passage 147, a small dowel pin 148 extending from one side, and a cord guide channel 149 under the bottom.

A needle 155 is shown in detail in Figures 33–40. The needle 155 includes a chuck engaging portion 156, a shank portion 157, and a rounded nose 158. A channel 159 in the bottom of the needle 155 extends the full length thereof. Near the nose 158 is a vertical passage 160, adjacent to which the shank 157 is formed with a saddle 161 for a purpose more particularly detailed below. A saddle 162 is provided to insure cord clearance at the chuck 140. The chuck engaging portion 156 is received in the passage 144 of the chuck 140 with the shank 157 of the needle 155 extending forwardly therefrom, as is clear from Figures 4 and 9. Suitable screws in the threaded passages 145 maintain the needle 155 in selected position in the passage 144.

A cord guide 165 of the configuration shown in Figures 23 and 24 is secured to the left side of the chuck 140 by suitable machine screws 166 (Fig. 9) which extend through spaced openings 167 in the cord guide 165 and into the threaded wells 146 of the chuck 140 (Fig. 31). The cord guide also includes spaced apertures 168 and 169, a cord eyelet 170 in a right angularly disposed tab 171, a second cord eyelet 172, and a third cord eyelet 173 formed in a right angularly disposed elongated tab 174. The eyelets 170, 172, and 173 are split to facilitate disposition of a cord in each. A large headed tension screw 175 is disposed through the opening 168 and in the passage 147, being spring biased (not shown) against the cord guide 165, which receives a cord beneath the head for tensioning thereof.

It is clear from the foregoing detailed description of the needle assembly 74 that the needle 155 wil be reciprocated in a horizontal plane as the eccentric 136 is rotated by the shaft 130 at the rate of one round trip per one complete rotation.

The looper assembly 76 and details thereof are shown in Figures 1, 2, 6, 8–10, 26–29, 41–43 and 50. The looper assembly 76 includes a looper bar carrier 180 of the general configuration clearly shown in Figures 9, 10 and 41–43, and is cast integrally. The looper bar carrier 180 includes spaced legs 181 and 182, a split bearing 183 being formed forwardly of the leg 182. A bridging portion 184 connects the legs 181, 182, above which is a rearwardly and upwardly extending fork 185 and a forwardly extending barrel portion 186. Within the forward portion of the fork 185 is a well 187 in alignment with the bore of the barrel portion 186, the forward portion of the fork 185 being spaced from the rear of the barrel portion 186, as is clear from Figure 42.

A notch 188 is formed in the bridging portion 184 intermediate thereof.

The looper bar carrier 180 spans the shaft 130 to the left of the needle bar carrier 122. The legs 181 and 182 also straddle an eccentric 190 which is secured by machine bolts to the integral flange 191 of a collar 192 adjustably secured to the shaft 130 by a setscrew for rotation therewith (Figs. 8 and 9). Manifestly, rotation of the eccentric 190 will effect reciprocative movement of the looper bar carrier 180.

The fork 185 engages a block 195 pivotally mounted on a stub shaft 196 supported by spaced upwardly extending legs of a U-bracket 197 bolted to an enlarged inwardly extending portion of the lower wall 103 (Figs. 9 and 10). The barrel portion 186 extends forwardly through an opening 200 formed in the cover 110 and the front wall portion 100 (Figs. 3 and 10). The opening 200 is sufficiently large to permit vertical movement of the barrel portion 186. A looper supporting shaft 202 extends through the barrel portion 186 and into the well 187, and is rotatable relative thereto. Spaced countersunk oil holes 203 are provided in the barrel portion 186 and forward portion of the fork 185.

A cam follower support 205 in the form of a split clamp is secured to the looper shaft 202 for rotation therewith between the fork 185 and the barrel portion 186 (Figs. 8–10). Suitable machine screws maintain the cam follower 205 in clamping engagement with the looper shaft 202, and permit relative adjustments therebetween. A stub shaft 206 is mounted in the cam follower 205, extending laterally therefrom, and receives a cam follower 207 thereon in freely rotative relation which is maintained against removal by a suitable screw 208. The cam follower 207 is illustrated as a ball, since the angular relationship of the stub shaft 206 to the horizontal will vary as the cam follower 207 tracks the periphery of a cam 209 secured to the flange 191 of the collar 192 by suitable bolts 210, as is clear from Figures 8 and 9. The cam follower 207 is constantly biased into engagement with the periphery of the cam 209 by a tension spring 212, one end of which is anchored in the free end of a post 213 secured to the cam follower support 205 for movement therewith and the other end of which is anchored in one end of an adjustment screw 214 threadedly mounted in the free end of a bracket 215 secured by suitable machine screws to one side of the fork 185. It will be noted that the stub shaft 206 and the portion of the cam follower 205 supporting it are disposed above the notch 188 which permits free downward movement of the cam follower 207 as required.

The cam 209 is of the configuration clearly shown in Figure 20, and includes arcuate slots 218 through which the bolts 210 extend. The slots 218 permit adjustment of the cam 209 about the shaft 130.

On the forward end of the looper supporting shaft 202 is a looper chuck 220, the latter being press-fitted on, or otherwise secured to, the former. The chuck 220 is of the general configuration illustrated in Figures 26 and 29, and includes a split clamp portion 221 having a vertical opening 222 therethrough which receives a cord looper 225. Suitable machine screws 226 maintain the looper 225 in position. The looper 225 includes a foot 227 formed as clearly illustrated in Figures 26–28, and includes a toe portion 228 and a heel inset shoulder 229.

For effecting vertical movement of the looper assembly 76, there is provided an eccentric 235 keyed to a shaft 236 rotatably mounted in bearings 237 and 238 supported by parallel vertical wall segments 239 and 240, respectively, extending inwardly and rearwardly from the front wall portion 100 (Figs. 8 and 9). Rotatably mounted about the eccentric 235 is an actuating arm 242, the upper end of which pivotally engages one end of a pin 243 clamped at one end in the split clamp 183, suitable machine screws being employed to clamp the pin 243 in fixed relation. A plate 244 maintains the actuating arm 242 on the eccentric 235, said plate 244 being maintained in desired registry by a pin 245, and against removal from the shaft 236 by a suitable spring clip 246. Also splined or otherwise secured to the shaft 236 is a gear 250 which is in mesh with an intermediate gear 251 mounted on the wall segment 240 by means of a bearing 252 and a stub shaft 253, as is clearly shown in Figure 8. The intermediate gear 251 is in mesh with a driven gear 255 concentric with the shaft 130, the gear 255 being secured to a second driven gear 256 by suitable machine screws and pins, the gear 256 being splined or otherwise secured to the shaft 130. It is to be noted that the ratio of the gears 250 and 255 is two to one, so that the former makes two revolutions to one for the latter to achieve a downward movement of the looper 225 at each end of the stroke.

It is manifest that in one full rotation of the shaft 130, the looper shaft carrier 180 will be reciprocated once over its path of movement longitudinally by the eccentric 190 and vertically by the eccentric 235. At the same time, the looper supporting shaft 202 will be oscillated by the cam 209 through the cam follower 207. The resulting movement of the foot 227 of the looper 225 is more particularly detailed below.

The turntable assembly 78 and components thereof are illustrated in Figures 1–4, 6, 10–19, and 22. The turntable assembly 78 includes a mounting bracket 265 illustrated as having a wedge-shaped portion 266 adjustably mounted in guideways 267 secured to the front wall 94 of the base 90, and spaced horizontal housing supporting arms 268, each having a horizontal guideway 269 formed integral therewith (Figs. 6 and 9). Suitable bolts 263 engage a gib 264 to maintain a snug sliding fit between portions 266 and the guideways 267. A threaded adjustment shaft 271 is vertically mounted in a bracket 272 for rotation, said shaft 271 at its upper end threadedly engaging a threaded boss 273 formed integral with the wedge-shaped portion 266. A locking thumb nut 274 is provided on the shaft 271 to maintain the bracket 265 in the position to which it is moved. The lower end of the threaded shaft 271 is formed to receive a crank handle, or the like.

An annular housing 275 includes horizontal elongated base portions 276 which are adjustably received in the guideways 269. A cover 277 is secured to the housing 275 by suitable machine screws 278. The housing 275 includes a partition 279, centrally of which is formed a bearing supporting sleeve 280. Centrally of the cover 277 is formed a bearing supporting boss 281, which is in alignment with the sleeve 280. Bearings 282 and 283 are mounted in the sleeve 280 and boss 281, respectively, and rotatably support in vertical position a shaft 285 of varying cross section, as is clear from Figure 9. The upper end of the shaft 285 is enlarged and includes a cylindrical chamber 290 receiving a piston 291, on the upper surface of which is mounted a cylindrical member 292 having a frusto-conical upper end portion 293 (Fig. 16).

A turntable 295 is secured to the top of the shaft 285 by means of screws 296 disposed in countersunk holes in the turntable 295 and threadedly engaging a flange 297 at the upper end of the shaft 285 (Fig. 16). A plate 298 is secured to the top of the turntable 295 by suitable screws 299 (Fig. 17). The turntable 295, in effect, caps the upper end of the shaft 285 and includes a central opening 300 into which the upper end of the cylindrical member 292 extends (Figs. 16, 18 and 19).

The piston 291 is maintained in the position illustrated in Figure 16 by a compression spring 303 surrounding the cylindrical member 292 and abutting the piston 290 at one end and a collar 304 at the other end, an expander ring 305 anchored in a groove in the inner face of the upper end of the shaft 285 maintaining the collar 304 against removal.

In the upper portion of the turntable 295 beneath the plate 298 are three radially extending channels 308 located at 120° to each other, in each of which is disposed a radially movable chuck member 309 having an inner angularly disposed end in engagement with the frusto-conical portion 293 of the cylindrical member 292 for movement of the former by the latter. A compression spring 310 constantly biases each chuck member 309 into engagement with the frusto-conical portion 293, the outer end of each spring 310 engaging a post 311 vertically mounted in a suitable opening in the turntable 295. The post 311 extends into an opening 312 in the chuck member 309 of sufficient diameter to permit sufficient outward movement of the chuck member 309 upon movement of the cylindrical member 292.

The turntable 295 includes an annular horizontal flange 315 on which are mounted four posts 316 spaced at 90° to each other (Figs. 6 and 9). A locating pin 317 is secured to the top of one post 316. Concentrically threadedly mounted on top of the plate 298 are spaced bevelled discs 319 and 320 between which the outer end of the needle 155 extends when the needle assembly 74 is in its forwardmost position, as is illustrated in Figures 9 and 16. The discs 319 and 320 prevent vertical movement of the needle 155 when in its forwardmost position, which could be caused by its engagement with loose wires on the stator, or other reason.

The shaft 285 has a vertical passage 325 therethrough opening into the chamber 290 beneath the piston 291. As is clear from Figures 14 and 15, the passage 325 is tapped near the lower end by three radially extending passages 326 formed in a reduced portion 327 of the shaft 285 which open into an annular passage 328 between the reduced portion 327 and a plug member 330 extending into the lower end of the sleeve 280 and secured thereto by suitable machine screws 331 (Fig. 9). The lower end of the passage 325 is closed by a threaded plug 332. A radial passage 333 in the plug 330 opens at one end into the annular passage 328 and at the other end into a vertical passage 334 in the plug 330, a fitting 335 being tapped into the passage 334 at one end and receiving an air line 336 at the other end.

As is clear from Figure 62, the air line 336 is in parallel with an air line 337 leading to an air pressure actuated switch 338, the air line 336 and the air line 337 being in open communication with an air line 339 which connects into a manually operated air valve 340. In one position of the air valve 340, air from a supply line 341 passes into the air line 339 through the air valve 340, and, in another position thereof, the air line 341 is closed and air in the air line 339 is exhausted through the exhaust line 342. The air line 341 is in communication with a main air supply line 343 which also feeds an air line 344 leading to a clutch actuating air cylinder 345 through a control solenoid air valve 346. It is to be noted from the diagram of Figure 62 that the air pressure switch 338 is in an eight-volt electrical circuit more particularly referred to below, although any voltage may be employed, and that air is supplied to close the switch 338 only when the air valve 340 for supplying air to the piston 291 is in operative position, so that the machine 70 will not operate unless the chuck members 309 are in expanded positions.

The indexing mechanism 80 is also the drive mechanism for rotating the turntable assembly 78. A standard roller gear drive 360 having sixteen rollers 361 is splined or otherwise secured to the shaft 285 and is engaged by an index cam 362 splined to a shaft 363 rotatably mounted in bearings 364 mounted in a housing 365 secured to the right side of the cover 277 by suitable bolts or which may be formed integral therewith (Fig. 6, sheet 5, Fig. 9, Sheet 6, and Fig. 22, Sheet 4). The shaft 363 extends rearwardly from the housing 365 and is connected to a shaft 366 by a coupling 367, the other end of the shaft 366 being connected to a short shaft 369 by a coupling 368 (Fig. 12).

The short shaft 369 is rotatably mounted in a bearing sleeve 370 secured in a boss formed integral with the lower front wall portion 101. On the inner end of the shaft 369 is a helical gear 371 which is pinned thereto for movement therewith and which includes an integral sleeve 372 rotatably mounted in bearings 373 supported in a sleeve 374 secured to the wall portion 114 by suitable machine screws and closed by a plate 375 connected to the outer end of the sleeve 374 by suitable screws. The helical gear 371 is in mesh with a second helical gear 380 keyed to a stub shaft 381 mounted in bearings 382 secured in a sleeve 383 connected to the front wall portion 101 by suitable machine screws and closed by a plate 384 secured to the outer end of the sleeve 383 by suitable screws. The helical gear 380 is in mesh with a third helical gear 387 at right angles thereto keyed to the shaft 130 for rotation therewith.

The indexing mechanism 80 illustrated may be replaced by other forms when it is desired to index the turntable assembly 78 in some angular increment other than twenty-two and one-half degrees, as shown (sixteen stops per revolution). It is a simple matter to replace the roller gear drive 360 and the cam 362 with comparable parts having a greater or lesser number of stops per revolution.

Referring back to Figures 6 and 9, a micro switch 395 for automatically stopping the machine 70 is mounted on the cover 277 at one side thereof which is normally in open position with the actuating arm 396 spring extended therefrom and in engagement with one arm 397 of a bell crank lever 394 pivotally mounted on a post 398 secured to the top of the cover 277, the other arm 399 thereof being in engagement with a shut-off cam 400 secured to the top of a vertical shaft 401 by a set-screw, or the like, for rotation therewith. The shaft 401 is rotatably mounted in a sleeve 402 disposed in a depending boss 403 integral with the cover 277. A gear 404 is secured to the lower end of the shaft 401 for rotation therewith and is in engagement with a second gear 405 concentric with the shaft 285 and secured to the roller gear drive 360 for rotation therewith by pins, or the like. The shut-off cam 400 includes an actuating cam portion 407 which engages the arm 399 one time in each revolution of the shaft 285, inasmuch as the gears 404 and 405 are of the same diameter and same number of teeth.

The motor 82 is within the base 90 and is mounted upon a plate 409 by suitable bolt assemblies 410, the plate 409 being mounted upon the wall 96 of the base 90 by suitable bolts 411 (Figs. 2-4). The driven shaft 414 of the motor 82 extends through a suitable opening in the rear wall 95. A pulley 415 is secured to the driven shaft 414 by a suitable setscrew, or the like, for rotation therewith. Spaced above the pulley 415 is a second pulley 416 which is mounted upon a shaft 417 for rotation therewith, the shaft 417 extending through the rear wall 103 and having bearing support therein and in the vertical wall segment 114 (Figs. 10 and 12). A belt 418 is trained about the pulleys 415 and 416 for transmission of power from the motor to the shaft 417. A guard 420 for the pulleys 415 and 416 and the belt 418 is secured to the rear wall 95 and to the rear wall 103 by suitable bolts. Interiorly of the upper portion 91, a worm gear 421 is mounted on the shaft 417, which is in driving engagement with a worm gear 422 secured to a clutch sleeve or cup 423 by suitable machine screws for rotation therewith.

The aforementioned clutch cup 423 is part of the clutch and brake assembly 84 which may be of standard construction as illustrated in Figures 6 and 7. The clutch cup 423 is freely rotatable, being secured to a bearing 425 which is mounted on a shaft 426 having rotatable support in end bearings 427 and 428 supported by an interior wall segment 429 and the right side wall portion 105, respectively. Within the clutch cup 423 are plates 431, alternate plates 431 having peripheral lugs extending into opposed slots 432 formed in the side of the cup 423 in the usual manner of such devices. The other plates 431 are keyed or otherwise secured to the shaft 426 for rotation therewith, all plates 431 being freely slidable longitudinally upon the shaft 426. Adjacent the plates 431 is an actuator member 435 which is slidable axially upon the shaft 426, having in engagement therewith a fork member 436 clamped to an actuator shaft 437 suitably journaled in the rear wall 103 and the front wall portion 101 for oscillative rotation. The shaft 437 extends beyond the front wall portion 101, as is clear from Figures 5 and 6, and receives on the free outwardly extending end a lever 438 which is clamped thereto for movement therewith and which is pivotally connected at the other end to an internally threaded socket member 439. Threadedly connected into the socket 439 is the free end of a piston rod 440, the actuating piston 441 of which is disposed in the solenoid controlled air cylinder 345 pivotally mounted upon a bracket 442 secured to an exterior top portion 443 of the base 90. Downward movement of the piston rod 440 will effect driving engagement between the clutch plates 431 and the clutch cup 423 to transmit the motor driven rotation of the worm gear 422 to the shaft 426. A driven gear 447 is keyed to the shaft 426 and is in mesh with the gear 256 keyed to the shaft 130 for transmitting the power of the motor 82 to the needle assembly 74, the looper assembly 76, the turntable assembly 78, and the indexing mechanism 80, as aforesaid.

For breaking the shaft 426, there is provided a braking cup 450 which is keyed or otherwise secured to the shaft 426 and with which is associated a plurality of braking plates 451, alternate ones of which include peripheral lugs extending into opposed slots 452 formed in the braking cup 450, the other plates 451 being keyed or otherwise secured to the shaft 426. The plates 451 are movable axially along the shaft 426, and, upon movement of the actuating member 435 to the right in Figure 7, caused by upward movement of the piston rod 440, rotation of the shaft 426 will immediately cease, thereby preventing overrun, inasmuch as the braking cup 450 includes a worm gear portion 454 integral therewith which is in mesh with a self-locking worm 455 secured to a shaft 456 having bearing support through suitable bearing elements mounted in the rear wall 103 and the front wall portion 102, as is clearly shown in Figure 11. As is particularly pointed out below, the shaft 456 is manually rotatable to move the braking cup 450 through the worm 455 and the worm gear portion 454, but the self-locking worm 455 cannot be moved through the worm gear portion 454.

The manual operating mechanism 86 is provided for actuating the several components of the machine 70 independently of the continuously running motor 82. Details of the manual operating mechanism 86 are best shown in Figures 1-4, 6 and 11, and include a hand wheel 465 freely rotatable on a fixed shaft 466 mounted in the front of the housing 275 by means of a suitable integral boss extending forwardly therefrom, said hand wheel 465 being maintained against removal by a nut 464. A sprocket 467 is secured to the hand wheel 465 for rotation therewith concentrically of the shaft 466 about which is trained a chain 468 which is also trained about a second sprocket 469 secured to a shaft 470 for rotation therewith. The shaft 470 is rotatably mounted in a sleeve portion 471 of a bracket 472 which is secured by suitable bolts to the forward side of the housing 365 as is clear from Figure 6. A universal joint 473 connects the shaft 470 to an axially extensible composite shaft 474, the rear end of the latter being connected by a universal joint 475 to the above-mentioned shaft 456 (Figs. 6 and 11). The braking cup 450 is in engagement through its plates 451 with the shaft 426 when the elements of the machine 70 are not in coil-tying operation, hence, manual operation of the hand wheel 465 will effect, through the aforementioned chain of elements including the worm 455 and the worm gear portion 454, rotation of the shaft 426 and therethrough rotation of the gear 447, which, therefore, drives the several assemblies of the machine 70 whether it is power or manually driven.

A cord spool supporting bracket 480 including a pin 481 is mounted to the rear wall 95 near the juncture of the left side wall 96 (Fig. 2). For supporting a cord 482 between a spool of cord 483 and the needle 155, spaced pairs of eyelet posts 484 and 485 are mounted on the cover 110. Between the eyelet posts 484 and 485 are a small pulley 486 and a tension device 487, both being mounted upon the cover as shown in Figures 2, 3 and 21. The tension device 487 is shown in detail in Figure 21, and includes a post 488 threadedly engaging the side of the top 110, opposed plates 489 which receive the cord 482 therebetween, compression springs 490, and a pair of locking and adjusting knurled nuts 491.

With reference to Figures 2, 21, 23, 24, 30, 31 and 33, the cord 482 leaves the spool 483 and is threaded through the eyelet members 484, across the pulleys 486, between the opposed discs 489 and under the shaft 488, through the eyelet members 485, through the split eyelet 170 of the cord guide 165, beneath the tension screw head 175, across the outer face of the cord guide 165, and through the split eyelet 172, under the chuck 140 and up through the split eyelet 173, thence around the front of the cord guide 165 into the channel 149 beneath the chuck 140, thence into and forwardly along the longitudinal channel 159 in the bottom of the needle 155, and upwardly through the opening 160. About six inches or so of cord 482 hangs loose in order to insure proper tying action.

A knife 493 is provided to the rear of the turntable 295 for manual severing of the cord 482 following each tying cycle of the machine 70, the knife 493 being bolted or otherwise secured to the front wall portion 100.

As is manifest from the electrical and air supply diagram of Figure 62, the electrical system for the machine 70 is quite simple. Start and stop buttons 500 and 501, respectively, control a switch 502 mounted on the left wall 96 of the base 90 for starting and stopping the motor 82 (Figs. 2 and 62). A 220 volt line 505 supplies power to the motor 82, which, as has been mentioned, runs continuously during use of the machine 70, and which may be a one-half horsepower, 1725 r.p.m., 220 volt, three phase, 60 cycle unit, although other suitable motors may be used. A 110 volt line 503 supplies power to a transformer 504 shown only in Figure 62.

For actuating the machine 70, there is provided a start push button 510 for closing a momentary contact switch 511 mounted on the left side 104 (Figs. 2 and 62). The switch 511 is in the 8 volt line, although, as stated, any voltage may be used, being connected to one side of the secondary of the transformer 512 by a lead 513 and to one contact of the air pressure switch 338 by a lead 514. The other contact of the switch 338 is connected by a lead 515 to one contact of a coil 516 of the solenoid air valve 346. The other contact of the coil 516 is connected by a lead 517 to the other side of the secondary 512. It is manifest that the closing of the switch 511 is ineffective to cause energization of the coil 516 of the solenoid air valve 346 unless the air pressure switch 338 is closed, the latter condition existing only when the air valve 340 is in operative position supplying air under pressure to the piston 291 which operates the spring-returned chuck members 309, as is set forth above. However, with the switch 338 closed, momentary contact of the switch 511 will effect energization of the coil 516 to cause air under constant pressure to be directed into the air cylinder 345 against the top of the piston therein to throw the clutch assembly into operation, and to cause exhaust of air from the bottom, thereby operatively interlocking the shaft 426 with the driven worm gear 422 to set the machine 70 into coil tying operation. The solenoid air valve 346 and the air cylinder 345 are standard equipment, Figure 62 diagrammatically illustrating working details which may include an air chamber 540 in the valve 346 into which the air line 344 constantly feeds, an air feed and exhaust line 541 leading from the chamber 540 to the upper end of the cylinder 345 for delivering air pressure above the piston 441 and exhausting it therefrom, an air feed and exhaust line 542 leading to the lower end of the cylinder 345 from the chamber 540, and a slide valve 543 in the chamber 540 alternately actuated by the coils 516 and 523. The slide valve 543 is provided with exhaust passageways 544 and 545, the passageway 544 registering with the line 542 when the valve 543 is in the position shown, and the passageway 545 registering with the passageway 541 when said valve is in its alternate position. Any other desired arrangement may be employed.

The wiring for the above-mentioned micro-switch 395, which automatically stops the machine 70 upon completion of one full tying cycle, includes a lead 520 from one contact thereof to one contact of an emergency stop switch 521, a jumper line 522 between contacts of the switches 521 and 511, the lead 513 to one side of the secondary 512, the lead 517 between the other side of secondary 512 and a common contact for terminal posts of the coil 516 and a second coil 523 of the solenoid air valve 346, the coil 523, and a lead 524 back to the other contact of the switch 395. Momentary closing contact of the switch 395 will effect energization of the coil 523 of the solenoid air valve 346 which will direct the constant pressure of air in the line 344 to the underside of the piston within the air cylinder 345, exhausting air from and cutting off the supply of air to the upper end thereof, which will render the clutch inoperative and make the brake effective to stop rotation of the shaft 426 through the interlocking of the elements detailed above.

A push button 527 is mounted below the start push button 510 for actuating the emergency stop switch 521 (Fig. 2), the circuit for the switch 521 including the jumper line 522, the line 513, the secondary 512, the line 517, the solenoid coil 523, the line 524, and a line 528 between contact of the automatic stop switch 395 and the switch 521, as illustrated in Figure 62.

In Figures 60 and 61, there is illustrated a stator 530 for an electric motor, the coil windings 531 of which are tied by sixteen chain stitch loops 532 on each side of the laminations 533. The stator 530 includes thirty-two slots and the usual apertures 534 in the laminations 533, one of which receives the locating pin 317.

As has been indicated above, the machine 70 is adjustable in its component assemblies and elements to tie or lace stators, or the like, of various diameters, numbers of slots, over-all configuration of laminations, and the like, as is manifest from the detail description above.

*Operation*

The operation of each of the individual assemblies and components of the machine 70 is set out above in connection with the detailed description of the elements of each, so that a lengthy detailed description of the operation is unnecessary. However, a summarized operation will be both helpful in a complete understanding of the machine 70 and will supply a ready key for one reviewing the patent.

In Figures 56–59, on Sheet 10 of the drawings, are illustrated by motion diagrams the interrelationship and the step-by-step paths of the centers of the needle eccentric 136, the two looper assembly eccentrics 190 and 235, the looper assembly cam 209, the center of the pivot pin 243, the center of the cam follower 207, the nose 158 of the needle 155, and the foot 227 of the looper 225, the last element viewed from the end in Figure 56 and from the side in Figure 59. The diagrams taken with the legends are self-explanatory and require no detailed explanation. It is to be understood, of course, that the numbers and letters sequentially designate the positions of the several elements; that is, the numeral 1 in each series of numerals indicates the position of the respective part or portion of a part in relation to the cam follower 207 and the cam 209 as shown in Figure 56, the former contacting the latter at the point designated by the numeral 1. It is also to be understood that the several positions are plotted on a basis of each twenty-two and one-half degrees of rotation of the shaft 130, sixteen sequential positions of each being illustrated.

Figures 51–55 are provided to further assist in an appreciation of the movements of the needle 155 and the looper 225. In Figure 51, the needle 155 has passed between two pieces of insulation and is being retracted, as is indicated by the arrow A. Meanwhile, the foot 227 of the looper 225 is being moved downwardly and across the outer end of the needle 155, as indicated by the arrow B. As the needle 155 backs up, a loop 546 is formed in the cord 482 above the saddle 161, as is clear from Figure 57, due to frictional engagement of the cord 482 with the coil winding, and the like, of the stator 530, the cord 482 beneath the needle 155 being within the longitudinal groove 159, so that substantially all of the slack will develop above the saddle 161. In Figure 51, the foot 227 is entering the loop 546. Direction of step-by-step movement of the stator 530 is indicated by the arrow D.

In Figure 52, the foot 227 has crossed the end of the needle 155, as indicated by the arrow B, and has moved rearwardly as indicated by the arrow C. Meanwhile, the needle 155 has continued its rearward movement as indicated by the arrow A.

In Figures 53 and 54, which show the same positions of the looper 225 and the needle 155, but from two different angles, the looper foot 227 has moved across the windings of the stator 530 and downwardly as indicated by the arrow B carrying with it the loop 546 which has moved into the position clearly illustrated in the two figures. Meanwhile, the needle 155 has completed its rearward movement and has started forward again as is indicated by the arrow A. The stator 530 has rotated twenty-two and a half degrees and indexed for further tying operations during the movement of the needle 155 from a position clearing the stator 530 to its rearmost position and return to position at which it is about to enter another space below the coil windings 531. The turntable 295 is stationary during movement of the needle 155 beneath the stator windings.

In Figure 55, the needle 155 is moving forwardly as indicated by the arrow A, the nose 158 of which has passed behind the foot 227 and through the loop 546, the looper 225 is moving upwardly as indicated by the arrow B out of engagement with the loop 546 for return to loop-engaging position on the other side of the coil windings 531.

The foregoing described sequence is repeated sixteen times during one complete revolution of the stator 530. As stated, the number of sequences depends upon the particular stator being tied.

In the use of the machine 70, a stator 530, or the like, is disposed upon the turntable 295 with the locating pin 317 entering one opening 534, or the like, which properly positions the stator 530 for the tying or lacing operation. The chuck members 309 will be in the retracted positions of Figure 16 under the influence of the compression springs 310. The handle of the air valve 340 is moved to the "on" position which communicates a constant supply of air under pressure to the bottom of the piston 291 and to the air pressure switch 338. The chuck members 309 are thereby moved radially outwardly into clamping engagement with the inner surface of the stator 530, as is detailed above, and the switch 338 is closed to ready the 8 volt circuit (Fig. 62).

The motor 82 is energized by pressing the starting button 50 to close the motor switch 502. Thereupon, the worm gear 422 is driven at a predetermined constant speed which, in turn, drives the clutch cup 423 of the clutch and brake assembly 84.

The start button 510 is pushed inwardly, momentarily closing the starting switch 511, which effects energization of the solenoid air valve 346, which, in turn, actuates the piston of the air cylinder 345 to move the clutch elements of the clutch and brake assembly 84 into operative relation to lock the clutch cup 423 with the shaft 426 to drive the gear 437 and therethrough the gear 256 which is keyed to and drives the shaft 130. The needle assembly 74 and the looper assembly 76 are operatively connected with the shaft 130, as detailed above, so that the needle 155 and the looper 225 are moved in timed coordinated relation, as discussed above, to tie the coil windings 531 of the stator 530 with a chain stitch in a spiral pattern. The turntable 295 is also actuated from the shaft 130, but is rotated in a step-by-step movement through the roller gear drive 360 and the indexing cam 362 in the well known manner of these conventional devices. Indexing always occurs while the needle 155 is free of the stator 530.

When one complete revolution of the turntable 295 is completed, the cam 400 engages the arm 399 of the bell crank lever 394 to close the switch 395 momentarily, thereby stopping the machine 70. As is detailed above, momentary closing of the switch 395 energizes the solenoid air valve 346 to effect reverse movement of the piston within the air cylinder 345 to release the clutch elements and to actuate the brake elements of the clutch and brake assembly 84. Thereupon, the cord 482 is severed manually on the knife 493, leaving sufficient reach of cord in the needle 155 to form a manually tied knot when the next tying cycle is completed.

The machine 70 may be manually actuated for purposes of adjustment of any of the component elements, or for indexing, or for any other purpose, the elements and operative relation thereof being detailed above.

The machine 70 in its present operation requires about thirteen seconds to tie one side of the coils of the stator 530, and, with efficient operator handling, will tie one hundred and twenty such stators per hour. Manifestly, the rate may be changed as required or desired. By hand, an average skilled individual will tie twenty to twenty-five stators per hour.

It is manifest that there has been provided a coil tying machine which efficiently fulfills the objects and advantages therefor.

It is to be understood that the foregoing description and the accompanying drawings have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. A machine for tying coils of electro-dynamo stators, or the like, comprising a support, rotatable table means for supporting a stator, or the like, power actuated chuck means in said table means for holding a stator in position, means mounted on said support for automatically tying the extended coils of a stator on said table means, power means for actuating said tying means, and means rendering said power means inoperative when said chuck means is in inoperative position.

2. A machine for tying coils of electro-dynamo stators, or the like, comprising a support, rotatable table means for supporting a stator, or the like, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point, means for oscillating said looper holding shaft relative to said shaft carrier, and power means for simultaneously actuating said table means, said needle and said looper member in a repeated predetermined pattern.

3. A machine for tying coils of electro-dynamo stators, or the like, comprising a support, rotatable table means for supporting a stator, or the like, a cord leading needle, means mounting said needle on said supporting for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point, means for oscillating said looper holding shaft relative to said shaft carrier, power means for simultaneously actuating said table means, said needle and said looper member in a repeated predetermined pattern, and means for automatically de-activating said power means upon completion of a predetermined tying cycle.

4. A machine for tying coils of electro-dynamo stators, or the like, comprising a support, rotatable table means for supporting a stator, or the like, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point, means for oscillating said looper holding shaft relative to said shaft carrier including a driven cam and a cam follower mounted on said looper holding shaft for oscillative movement therewith, said cam having a periphery of predetermined configuration to effect two complete oscillative movements of said looper member across said needle in each full reciprocative movement of said needle, and power means for simultaneously actuating said table means, said needle and said looper member in a repeated predetermined pattern.

5. A machine for tying coils of electro-dynamo stators, or the like, comprising a support, rotatable table means for supporting a stator, or the like, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point including a rotatably mounted cam and means connecting said cam with said shaft carrier, said cam being rotatable through two complete revolutions in each complete reciprocative movement of said shaft carrier to effect two complete vertical movements of said looper member relative to said needle during one complete reciprocative movement of the latter, means for oscillating said looper holding shaft relative to said shaft carrier, and power means for simultaneously actuating said table means, said needle and said looper member in a repeated predetermined pattern.

6. A machine for tying coils of electro-dynamo stators, or the like, comprising a support, rotatable table means for supporting a stator, or the like, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point including a rotatably mounted cam and means connecting said cam with said shaft carrier, said cam being rotatable through two complete revolutions in each complete reciprocative movement of said shaft carrier to effect two complete vertical movements of said looper member relative to said needle during one complete reciprocative movement of the latter, means for oscillating said looper holding shaft relative to said shaft carrier, power means for simultaneously actuating said table means, said needle and said looper member in a repeated predetermined pattern, and means for deenergizing said power means upon completion by said needle and looper member of a predetermined number of cooperative movements.

7. A machine for tying coils of electro-dynamo stators, or the like, comprising a support, rotatable table means for supporting a stator, or the like, expandible chuck means associated with said table means for maintaining a stator, or the like, firmly in predetermined relation to said table means, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point including a rotatably mounted cam and means connecting said cam with said shaft carrier, said cam being rotatable through two complete revolutions in each complete reciprocative movement of said shaft carrier to effect two complete vertical movements of said looper member relative to said needle during one complete reciprocative movement of the latter, means for oscillating said looper holding shaft relative to said shaft carrier, power means for simultaneously actuating said table means, and means rendering said power means inoperative when said chuck means is in release position.

8. A machine for tying coils of electro-dynamo stators, or the like, comprising a support, rotatable table means for supporting a stator, or the like, means mounted on said support for automatically tying the extended coils of a stator on said table means including means for repeatedly leading a double reach of cord through an opening between the stator laminations and extending coils, means for looping the cord back across the coils, and means for leading another double reach of cord through the returned coil loop, power means for actuating said tying means and for rotating said table means, means for automatically deenergizing said power means upon the completion by said cord leading and said cord looping means of a predetermined number of tying movements and manually operable means for actuating said tying means and for rotating said table, said manually operable means being effective only when said power means is inoperative.

9. A machine for tying coils of electro-dynamo stators, or the like, comprising a support, rotatable table means for supporting a stator, or the like, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point, means for oscillating said looper holding shaft relative to said shaft carrier, power means for simultaneously actuating said table means, said needle and said looper member in a repeated predetermined pattern, and manually operable means for actuating said tying means and for rotating said table, said manually operable means being effective only when said power means is inoperative.

10. A machine for tying coils of electro-dynamo stators, or the like, comprising a support, rotatable table means for supporting a stator, or the like, power actuated chuck means in said table means for holding a stator in position, a cord leading needle, means mounting said needle on said support for reciprocative movement relative to said table means, a looper member, carrier means supporting said looper member mounted on said support including a looper holding shaft and a shaft carrier, said looper holding shaft being rotatable relative to said shaft carrier, means for reciprocating said shaft carrier horizontally, means for reciprocating said shaft carrier vertically about a pivot point, means for oscillating said looper holding shaft relative to said shaft carrier, power means for simultaneously actuating said table means, said needle and said looper member in a repeated predetermined pattern, and means rendering said power means inoperative when said chuck means is in inoperative position.

References Cited in the file of this patent
UNITED STATES PATENTS

| | | |
|---|---|---|
| 394,783 | Merrow | Dec. 18, 1888 |
| 768,906 | Necker | Aug. 30, 1904 |
| 1,098,276 | Lindeberg | May 26, 1914 |
| 1,197,305 | Plumley | Sept. 5, 1916 |
| 2,026,222 | Dixon | Dec. 31, 1935 |
| 2,074,488 | Prazak | Mar. 23, 1937 |
| 2,307,430 | Thompson | Jan. 5, 1943 |
| 2,437,624 | Sutker | Mar. 9, 1948 |
| 2,546,393 | Hale | Mar. 27, 1951 |
| 2,646,013 | Haas | July 21, 1953 |